US006641919B1

(12) United States Patent
Hayashi et al.

(10) Patent No.: US 6,641,919 B1
(45) Date of Patent: Nov. 4, 2003

(54) RESIN-BONDED MAGNET

(75) Inventors: Shinichi Hayashi, Shiroi-machi (JP); Shoichi Yoshizawa, Inzai (JP)

(73) Assignee: Sumitomo Metal Mining Co., Ltd., Tokyo (JP)

( * ) Notice: Subject to any disclaimer, the term of this patent is extended or adjusted under 35 U.S.C. 154(b) by 0 days.

(21) Appl. No.: 09/856,665

(22) PCT Filed: Nov. 12, 1999

(86) PCT No.: PCT/JP99/06330

§ 371 (c)(1),
(2), (4) Date: Jul. 16, 2001

(87) PCT Pub. No.: WO00/34963

PCT Pub. Date: Jun. 15, 2000

(30) Foreign Application Priority Data

Dec. 7, 1998 (JP) .......................................... 10-347099

(51) Int. Cl.[7] ............................ B32B 5/02; B32B 5/16; H01F 1/03; H01F 1/055

(52) U.S. Cl. ....................... 428/403; 428/323; 428/328; 428/329; 428/480; 428/482; 428/900; 428/407; 252/62.51 R; 252/62.53; 252/62.54; 252/62.56; 252/62.55

(58) Field of Search ................................ 428/323, 328, 428/329, 480, 483, 900, 403, 407; 252/62.51 R, 62.53, 62.55, 62.54, 62.56; 148/300

(56) References Cited

U.S. PATENT DOCUMENTS

| | | | | | |
|---|---|---|---|---|---|
| 4,462,919 | A | * | 7/1984 | Saito et al. | 252/62.54 |
| 4,626,371 | A | * | 12/1986 | Ikenaga et al. | 252/62.51 R |
| 4,879,055 | A | * | 11/1989 | Sezaki et al. | 252/62.54 |
| 4,919,858 | A | * | 4/1990 | Newton et al. | 148/105 |
| 5,451,654 | A | * | 9/1995 | Sanchez et al. | 526/204 |
| 5,464,670 | A | * | 11/1995 | Ikuma et al. | 264/177.14 |
| 5,952,416 | A | * | 9/1999 | Tani et al. | 430/423 |

FOREIGN PATENT DOCUMENTS

| | | | |
|---|---|---|---|
| GB | 1266369 | * | 3/1972 |
| JP | 2-254701 | * | 10/1990 |
| JP | 4-284601 | * | 10/1992 |
| JP | 7-122418 | * | 5/1995 |
| JP | 08-138923 | * | 5/1996 |
| JP | 11-126710 | * | 5/1999 |
| JP | 11-135314 | * | 5/1999 |

* cited by examiner

*Primary Examiner*—Vivian Chen
(74) *Attorney, Agent, or Firm*—Dykema Gossett PLLC

(57) ABSTRACT

A resin-bonded type magnet molded from a composition comprising a magnetic powder and a resin powder in which a resin binder comprises at least one unsaturated polyester resin cured product as the main ingredient. The resin binder contains a peroxide or a reaction product thereof capable of curing at a temperature of 150° C. or lower, and an anisotropic magnetic field of the magnetic powder is 50 kOe or more, and 50% by weight or more of the particles of magnetic powder has a grain size of 100 $\mu$m or less. The resin-bonded type magnet is obtained by molding by an injection molding process, an injection molding, a compression process, an injection compression molding process, an injection pressing molding process, or a transfer molding process.

6 Claims, No Drawings

RESIN-BONDED MAGNET

FIELD OF THE INVENTION

This invention concerns a resin-bonded magnet which is excellent in magnetic properties.

THE PRIOR ART

The recent years, ferrite magnets, alnico magnets, rare earth metal magnets and the like have been used in various applications, including motors. However, since such magnets are prepared mainly by a sintering method, they are generally fragile, and magnets of reduced thickness or complicated shapes can not be obtained easily. Further, since shrinkage during sintering is as large as 15 to 20%, they have drawbacks in that high dimensional accuracy can not be obtained and a post treatment such as polishing is necessary for improving shape accuracy.

Resin-bonded type magnets overcome such drawbacks and develop new application uses, and comprise thermoplastic resins such as polyamide resin or polyphenylene sulfide resin as a binder in which magnetic powder is filled.

However, since the resin magnets using the thermoplastic resin as the binder are exposed to a high temperature of 200° C. or higher during molding, they involve problems, particularly, inevitable degradation of the coersive force or shape deterioration of the squareness. Resin bonded magnets with less reduction in magnetic properties after molding have not yet been obtained.

Further, although magnets obtained using a thermosetting resin such as an epoxy resin or bis maleimide triazine resin as a binder in which a magnetic powder is filled have also been proposed, this can provide the resin-bonded type magnet only of a simple molding product by a compression molding process because of the small amount of the binder.

In recent years, the resin-bonded type magnets used for example, in small-sized motors, acoustic equipment and office automation equipment have been required to be excellent in magnetic properties and to have complicated shapes in view of the demand for reducing the size of the equipment.

The relation between the magnetic properties and the shape of the resin-bonded type magnets obtained by the existent methods was insufficient for use in the applications described above and sooner improvement for the resin-bonded type magnets has been demanded.

SUMMARY OF THE INVENTION

In view of the above, it is an object of this invention to overcome the drawbacks in (1) the existent resin-bonded type magnets obtained by the injection molding process using the thermoplastic resin that have low magnetic properties but can be molded into complicated shapes and (2) the resin-bonded type magnets obtained by the compression molding process using the existent thermosetting resin that have high magnetic properties but have only simple shapes, respectively, and to provide a resin-bonded type magnet, particularly, excellent in the magnetic properties, as well as excellent in the degree of freedom for the shape, moldability and mechanical strength, and further, providing excellent anti-rusting effect and improved yield of products, by preventing the lowering of the magnetic properties caused by oxidative degradation during existent high temperature molding and enabling a high degree of orientation in the anisotropic magnet material for which the orientation is important.

That is, the present inventors have made various studies for attaining the foregoing object and, as a result, have accomplished this invention based on the finding that a resin-bonded type magnet having magnetic properties, particularly, excellent coersive force and degree of orientation, degree of freedom for the shape, moldability and mechanical strength, can be obtained from a composition of a magnetic powder and an unsaturated polyester resin and molding in an injection molding process or a transfer molding process.

That is, the resin-bonded type magnet according to this invention is a resin-bonded type magnet formed by molding a composition comprising a magnetic powder and a resin binder in which the resin binder comprises at least one unsaturated polyester resin curing product as a main ingredient.

It is preferred that the resin binder comprising the unsaturated polyester resin curing product as the main ingredient contains a peroxide or a reaction product thereof capable of curing at a temperature of 150° C. or lower, the anisotropic magnetic field (HA) of the magnetic powder is 50 kOe or more, and 50% by weight or more of the particles of the magnetic powder have a grain size of 100 $\mu$M or less.

The resin-bonded type magnet according to this invention can be obtained by an injection molding process, an injection compression molding process, an injection press molding process or a transfer molding process.

The resin-bonded type magnet according to this invention may be coated at the surface thereof with a thermosetting resin.

Any of the resin-bonded type magnets described above may be pulverized again and mixed with a thermosetting resin or a thermoplastic resin again to form a resin-bonded type magnet.

BEST MODE FOR PRACTICING THE INVENTION

This invention will now be described in greater detail with respect to preferred embodiments.

For the magnetic powder used in this invention, those magnetic powders used so far in resin-bonded type magnets can be used and they can include, for example, rare earth metal-cobalt series, rare earth metal- iron-boron series and rare earth metal-iron-nitrogen series magnetic powders, which are magnetic powders having anisotropic magnetic field (HA) of 50 kOe or more.

The present inventors have confirmed that a resin-bonded type magnet particularly having excellent magnetic properties can be obtained by using Sm—Fe—N series fine alloy powder obtained by nitriding and finely pulverizing a coarse Sm—Fe series alloy powder obtained by a reductive diffusion method, a fine alloy powder obtained by finely pulverizing a coarse Sm—$Co_5$ series alloy powder also obtained by the same reductive diffusion method, an alloy powder obtained by a liquid quenching method of Nd—Fe—B series powder or an anisotropic Nd—Fe—B series alloy powder by an HDDR (Hydrogenation—Disproportionation—Desorption—Recombination) method, as the magnetic powder in the resin-bonded type magnet.

Further, since the Nd—Fe—B series magnetic powder obtained by the liquid quenching method or the anisotropic Nd—Fe—B series magnetic powder obtained by the HDDR method contains a great amount of relatively large particles having a unique shape, it is preferably used after being pulverized by a jet mill or a ball mill. This invention can provide a remarkable effect in a composition containing a magnetic powder, 50% by weight or more of which has a grain size of 100 μm or less, and the effect is more remarkable in the anisotropic magnetic powder which is essentially molded in the magnetic field than in the isotropic magnetic power in view of the orientation characteristics.

Then, the unsaturated polyester resin as the essential ingredient in this invention cures in a molding die during molding and serves as a binder for the magnetic powder, and generally marketed unsaturated polyester resins can be used with no particular restrictions on their types and two or more of unsaturated polyester resins may also be used as a mixture.

The unsaturated polyester resin comprises a main ingredient, for example, prepared by preliminarily polymerizing an unsaturated polybasic acid and/or saturated polybasic acid and glycols to a molecular weight of about 5000 or less as an oligomer or prepolymer, and monomers also serving as a cross-linker, a curing agent for initiating the reaction, a polymerization inhibitor for ensuring a long time storability and other additives.

Polybasic acid can include, for example, maleic acid anhydride, fumaric acid and itaconic acid and the saturated polybasic acid can include, for example, phthalic acid anhydride, isophthalic acid, terephthalic acid, tetrahydrophthalic acid anhydride, methyltetrahydro phthalic acid anhydride, endomethylene tetrahydrophthalic acid hydride, adipic acid, sebasic acid, HET acid, and tetrabromophthalic acid anhydride. Further, the glycols can include, for example, ethylene glycol, propylene glycol, diethylene glycol, dipropylene glycol, neopentyl glycol, 1,3-butane diol, 1,6-hexane diol, hydrogenated bisphenol A, bisphenol A propylene oxide adduct, dibromoneopentyl glycol, pentaerythrit diallyl ether and allyl glycidyl ether.

The monomers also serving as the cross-linker can include, for example, vinyl monomers such as styrene, vinyl toluene, α-methylstyrene, methylmethacrylate and vinyl acetate, allyl monomers such as diallyl phthalate, diallyl isophthalate, triallyl isophthalate, triallyl isocyanurate and diallyl tetrabromo phthalate, and acrylic esters such as phenoxy ethyl acrylate, 1,6-hexane diol diacrylate, trimethylol propane triacrylate and 2-hydroxyethyl acrylate.

As the curing agent, peroxides or reaction products thereof capable of curing at a temperature of 150° C. or lower are used and organic peroxides are generally used, which include, for example, ketone peroxides such as methyl ethyl ketone peroxide, cyclohexanone peroxide, 3,3,5-trimethylcyclohexanone peroxide, methylcyclohexanone peroxide, methyl acetoacetate peroxide and acetyl acetone peroxide, peroxy ketals such as 3,3,5-trimethylcyclohexane, 1,1-bis(t-butyl peroxy)cyclohexane, 2,2-bis(t-butylperoxy) octane, n-butyl-4,4-bis(t-butylperoxy)valerate and 2-2-bis(t-butylperoxy)butane, hydroperoxides such as t-butyl hydroperoxide, cumene hydroperoxide, diisopropylbenzene hydroperoxide, menthane hydroperoxide, 2,5-dimethyl hexane-2,5-dihydroperoxide, and 1,1,3,3-tetramethylbutyl hydro peroxide, dialkyl peroxides such as di-t-butylperoxide, t-butylcumyl peroxide, di-cumyl peroxide, α, α'-bis (t-butylperoxyisopropyl)benzene, 2,5-dimethyl-2,5-di (t-butyl peroxy) hexane and 2,5-dimethyl-2,5-di(t-butylperoxy)hexine-3), diacyl peroxides such as acetyl peroxide, isobutyl peroxide, octanonyl peroxide, decanoyl peroxide, lauroyl peroxide, 3,5,5-trimethylhexanoyl peroxide, succinic acid peroxide, benzoyl peroxide, 2,4-dichlorobenzoyl peroxide, and toluoyl peroxide, peroxy dicarbonates such as diisopropylperoxy dicarbonate, di-2-methylhexylperoxy dicarbonate, di-n-propylperoxy dicarbonate, bis(4-t-butylcyclohexyl)peroxy dicarbonate, di-myristylperoxy dicarbonate, di-2-ethoxyethylperoxy dicarbonate, di-methoxyisopropylperoxy dicarbonate, di(3-methyl-3-methoxybutyl)peroxy dicarbonate and diallyperoxy dicarbonate. Peroxy esters such as t-butylperoxy acetate, t-butylperoxy isobutylate, t-butylperoxy pivarate, t-butylperoxy neodecanoate, cumylperoxy neodecanoate, t-butylperoxy-2-ethylhexanoate, t-butylperoxy-3,5,5-trimethylhexanoate, t-butylperoxy laurate, t-butylperoxy benzoate, di-t-butylperoxy isophthalate, 2,5-dimethyl-2,5-di (benzoylperoxy)hexane, t-butylperoxy maleic acid, t-butylperoxyisopropyl carbonate, cumyl peroxy octoate, t-hexylperoxy neodecanoate, t-hexylperoxy pivarate, t-butylperoxy neohexanoate, t-hexyl peroxy neohexanoate, and cumylperoxy neohexanoate, and acetylcyclohexyl sulfonyl peroxide and t-butylperoxyallyl carbonate.

In this invention, a peroxide or reaction product capable of curing at a temperature of 150° C. or lower is used as a curing agent, because the magnetic properties, particularly, coersive force is greatly deteriorated with those capable of curing in excess of 150° C.

Then, the organic peroxides described above any be used alone but they can be used in a state diluted with hydrocarbon solutions or phthalic acid esters, or in a state absorbed to solid powders depending on the kind. In any case, there is no particular restriction on the kind so long as the peroxide or the reaction product thereof capable of curing at a temperature of 150° C. or lower is used but it is desirable to use an organic peroxide having a property that the decomposition temperature for obtaining a half life of 10 hours is 120° C. or less and, further, an organic peroxide having the decomposition temperature for obtaining the half life of 40° C. or higher and 100° C. or lower is more preferred. When those having the half life in excess of 120° C. are selected, since the curing temperature for obtaining a sufficient cured molding product becomes higher and the curing time is also made longer, the effect of this invention to prevent the degradation of the magnetic properties is reduced. Further, if it is lower than 40° C., the handling for the peroxide itself is difficult and the storage property of the composition before molding the resin-bonded type magnet according to this invention is worsened to lack in the productivity. However, it will be apparent that even organic peroxides having the decomposition time for the preferred half life out of the range can be used in this invention so long as the conditions in the molding process are well-arranged.

The addition amount of the peroxide described above is different depending on the dilution ratio or the amount of active oxygen and can not be specified but, generally, it is added by 0.01 to 5% by weight based on the unsaturated polyester resin. The peroxide can be used alone or as a mixture of two or more of them and can be used in combination with a cobalt salt of an organic acid such as cobalt naphthenate or cobalt octylate. β-diketones such as acetyl acetone, ethylacetoacetate and dimedone, aromatic tertiary amine such as dimethyl aniline, mercaptanes, phosphorus compounds such as triphenyl phosphine and 2-ethylhexyl phosphite, promoting agent such as quaternary ammonium salts, azo compounds such as azobis iso butyronitrile, aromatic carbonyl compounds and pinacone derivatives.

The polymerization inhibitor for ensuring the long time storability can include, for example, quinones, such as p-benzoquinone, naphthoquinone, phenanthraquinone, toluquinone, 2,5-diphenyl-p-benzoquinone, 2,5-diacetoxy-p-benzoquinone, 2,5-dicaproxy, p-benzoquinone and 2,5-diacyloxy-p-benzoquinone, hydroquinones such as hydroquinone, p-t-butylcathecol, 2,5-di-t-butylhydroquinone, mono-di-t-butylohydroquinone, and 2,5-di-t-amylhydroquinone, phenols such as di-t-butylparacresol hydroquinone monomethyl ether, and α-naphthol, organic and inorganic copper salts such as copper naphthenate, amidines such as acetoamidine acetate and acetoamidine sulfate, hydrazines such as phenylhydrazine hydrochloride, and hydrazine hydrochloride, quaternary ammonium salts such as trimethyl benzyl ammonium chloride, lauryl pyridinium chloride, cetyl trimethyl ammonium chloride, phenyl trimethyl ammonium chloride trimethyl benzyl ammonium oxalate, di(trimethyl benzyl ammonium) oxalate, trimethyl benzyl ammonium maleate, trimethyl benzyl ammonium tartarate and trimethyl benzyl ammonium glycolate, amines such as phenyl-β-naphthyl amine, parabenzyl aminophenol and di-β-naphthyl paraphenylene diamine, nitrocompounds such as nitrobenzene, trinitrotoluene and piclic acid, oximes such as quinone dioxime and cyclohexanone oxime, polyhydric phenols such as pyrogallol, tannic acid and resorcin, amine hydrochlorides such as triethylamine hydrochloride, dimethyl aniline hydrochlorides and dibutylamine hydrochloride chloride, which may be used alone or as a mixture of two or more of them.

One or more of unsaturated polyester resin binders used in this invention can be molded into resin-bonded type magnets with addition of various other additives than the various ingredients described above. For example, various kinds of reactive resins such as novolac type or bisphenol type vinyl ester resins using epoxy resin as the raw material, phenol resin, urea resin, melanine resin, diallyl phthalate resin, epoxy resin, silicone resin, urethane resin, polyimide resin, bismaleimide triadine resin and polyamideimide resin, and those intended for the improvement of the moldability, for example, waxes such as paraffin wax, liquid paraffin, polyethylene wax, polypropylene wax, ester wax, carnauba wax and micro wax, fatty acids such as stearic acid, 1,2-oxystearic acid, lauric acid, palmitic acid and oleic acid, aliphatic acid salts (metal soaps) such as calcium stearate, barium stearate, magnesium stearate, lithium stearate, zinc stearate, aluminum stearate, calcium laurate, zinc linoleate, calcium licinoleate, zinc 2-ethyl-hexonoate, fatty acid amides such as stearic acid amide, oleic acid amide, ercaic acid amide, behenic acid amide, palmitic acid amide, lauric acid amide, hydroxystearic acid amide, methylenebis stearic acid amide, ethylenebis stearic acid amide, ethylenebis lauric acid amide, distearyl adipic acid amide, ethylene bisoleic acid amide, dioleyl adipic acid amide and N-stearyl stearic acid amide, fatty acid esters such as butyl stearate, alcohols such as ethylene glycols, stearyl alcohols, polyethers such as polyethylene glycol, polypropylene glycol, polytetramethylene glycol and modification products thereof, polysiloxanes such as dimethyl polysiloxane and silicone grease, fluorocompounds such as fluoric oil, fluoric grease and fluoro-containing resin powder, in organic compound powders such as of silicon nitride, silicon carbide, magnesium oxide, alumina, silicone dioxide and molybdenum disulfide can be added alone or a mixture of two or more of them.

In addition to the organic additives described above, inorganic fillers or pigments may optionally be added. The inorganic filler can include, for example, ferritic magnetic powders such as of strontium ferrite series or barium ferrite series, soft magnetic powders such as iron, density controlling high specific gravity metal powders such as tungsten, flame retardants such as antimony trioxide, and pigments such as titanium oxide.

Each of the ingredient to be mixed with the unsaturated polyester resin binder described above is not restricted by the degree of polymerization or the molecular weight but it is preferred that the kinetic viscosity at the molding temperature in a mixed and conditioned state before adding the magnetic powder is contained within a range from 100 mPa·s to 5000 mpa·s by the rotational viscosity measuring method. For adjusting to the viscosity described above, several kinds of clays or unsaturated polyester resins of different properties may be mixed with each other, oxides or hydroxides of bivalent metals such as beryllium oxide and magnesium oxide, diisocyanates, arizirine compounds and aluminum isopropoxide may also be added.

Accordingly, each ingredient constituting the unsaturated polyester resin binder may be, for example, in the form of liquid, powder, beads or pellet at a normal temperature with no particular restrictions but it is desirable to be liquid after mixing in view of the homogeneous mixing with the magnetic powder and the moldability. Further, one or more of different resins or those of different molecular weights and properties may be combined and mixed to each other.

The viscosity of the final binder mixture mainly comprising the thermosetting resin described above is measured in accordance with JIS K 7117 (viscosity test method by a rotational viscometer for the liquid resin), and the measuring temperature is measured in a thermostable bath, that temperature being adjusted to the molding temperature (cylinder temperature during molding).

It is preferred to use those having the measured value of 100 mPa·s to 5000 mPa·s and, particularly, those having 300 mPa·s to 3000 mPa·s are more preferred. If the kinetic viscosity is less than 100 mPa·s, molding is impossible since separation is caused between the magnetic powder and the binder during injection molding and, on the other hand, if it exceeds 5000 mPa·s, since remarkable increase of the kneading torque and lowering of the fluidity are caused making it difficult for molding, the effect of this invention can not be obtained.

Further, the unsaturated polyester resin binder described above is added by the addition amount in excess of 5 parts by weight and less than 50 parts by weight in a state including each of the constituent ingredients based on 100 parts by weight of the magnetic powder. It is preferably from 7 parts by weight or more and 15 parts by weight or less and, further preferably, 10 parts by weight or more and 13 parts by weight or less. If the addition amount of the resin binder compound is 5 parts by weight or less based on 100 parts by weight of the magnetic powder, the strength of the molding product is lowered and the fluidity during molding is lowered remarkably, so that the effect of this invention can not be obtained. Further, when it is 50 parts by weight or more, no desired magnetic properties are obtainable.

In this invention, there is no particular restrictions on the mixing method for each of the ingredients and it is practiced by using a mixer, for example, a ribbon blender, a tumbler, a nauta mixer, a Henschel mixer and a super mixer, or kneaders such as a Banbury mixer, kneader, roll, kneader ruder, single screw extruder, and two screw extruder.

The composition before molding the resin-bonded type magnet according to this invention is obtained by mixing each of the ingredients into lumps. The resultant composition is molded by various kinds of thermosetting resin molding machines such as an injection molding machine or a transfer molding machine and, particularly, by an injection molding machine but it may be molded by a molding machine with addition of injection compression molding or injection pressing function.

As described above, in this invention, a resin-bonded type magnet can be obtained by molding and curing a composition comprising a magnetic powder and a resin binder containing one or more of unsaturated polyester resins as the main ingredient.

Further, in this invention, for attaining the anti-rusting effect of the resultant resin-bonded type magnet, the surface of the resin-bonded type magnet can be coated with a thermosetting resin such as an epoxy resin, or bismaleimide triadine resin. The thickness of the coating layer in this case is preferably from 10 to 100 μm in view of keeping for the magnetic properties and in view of the anti-rusting effect.

Further, in this invention, the resin-bonded type magnet obtained as described above, particularly, odds and ends of the resin-bonded type magnet can be pulverized again to 200 μm or less and then mixed again with the thermosetting resin as exemplified above or the thermoplastic resin identical with those in the existent resin such as polyamide resin or polyphenylene sulfide resin and can be molded into the resin-bonded type magnet in the same manner as described above, so that the yield of the products can be improved remarkably.

The addition amount of the thermosetting resin or the thermoplastic resin to the pulverizates of the resin-bonded type magnet is preferably within a range from 10 to 100 parts by weight based on 100 parts by weight of the pulverizates.

EXAMPLE

This invention is to be explained more specifically with reference to examples and comparative examples. Details for each of the ingredients used in examples and comparative examples, the test methods and evaluations are exemplified but they are not limitative unless departing from the gist of this invention.

Resin-bonded type magnets were manufactured by the following materials and the method and evaluated. The materials used are shown below.

A Magnetic Powder

Magnetic powder 1: Sm—Fe—N series magnetic powder, (Sm—Fe—N alloy powder manufactured by Sumitomo Metal Mining Co.)

Anisotropic magnetic field: 210 kOe containing 99% by weight of particles with a diameter of 100 μm or less.

Magnetic powder 2: Sm—Co series magnetic powder, (Trade name: $RCo_5$ alloy manufactured by Sumitomo Metal Mining Co.)

Anisotropic magnetic field: 246 kOe containing 99% by weight of particles with a diameter of 100 μm or less.

Magnetic powder 3: Nd—Fe—B series magnetic powder, (trade name: MQP-B, manufactured by Magnequench International Co.)

Anisotropic magnetic field: 70 koe containing 62% by weight of particles with a diameter of 100 μm or less.

Magnetic powder 4: Nd—Fe—B series magnetic powder, (Trade name: MQP-B, manufactured by Magnequench International Co.)

Anisotropic magnetic field: 70 kOe containing 31% by weight of particles with a diameter of 100 μm or less.

B Thermosetting Resin and Nylon 12 as Comparative Example

Unsaturated polyester resin (UP resin 1)

(Trade name: Eporack N-21B, manufactured by Nippon Shokubai Co.) viscosity at 25° C., 110 mPa·s Unsaturated polyester resin (UP resin 2)

(Trade name: Ligorack 4214, manufactured by Showa Kobunshi Co. Ltd.) viscosity at 25° C., 3800 mPa·s Unsaturated polyester resin (UP resin 3)

(Trade name: Ligorack M-500D Showa Kobunshi Co. Ltd.) viscosity at 25° C. 1100 mPa·s Nylon 12

(Trade name: Diamide A-1709P, Daicel Huels Co. Ltd.)

C Curing Agent

Curing agent 1: peroxyester type peroxide (t-butylperoxybenzoate)

(Trade name: Perbutyl Z, manufactured by NOF Corporation Ltd.)

Decomposition temperature for obtaining 10 hour half life: 104° C.

Curing agent 2: hydroperoxide type peroxide (p-mentane hydroperoxide)

(Trade name: Permenta H, manufactured by NOF Corporation Ltd.)

Decomposition temperature for obtaining 10 hours half life: 133° C.

Curing agent 3: hydroperoxide type peroxide (cumene hydroperoxide)

(Trade name: Percumyl H, manufactured by NOF Corporation Ltd.)

Decomposition temperature for obtaining 10 hours half life: 158° C.

Manufacturing method and evaluation method for each of the molding products were practiced as described below.

1. Viscosity Control for a Resin Binder

The viscosity for each of the unsaturated polyester resins was controlled by the following method. "UP resin 1" was increased for the viscosity to 700 mPa·s by evaporating styrene to reduce the weight under a reduced pressure atmosphere in a warm bath at 80° C. by using an evaporator to form "UP resin 1'". "UP resin 2" was reduced for the viscosity to 2500 mPa·s at 25° C. by properly adding and mixing styrene to the resultant resin to form "UP resin 2'".

2. Mixing and Preparation of Composition

Predetermined thermosetting resin and the curing agent were added so as to provide a predetermined ratio based on the entire amount of each of magnetic powders (each on parts by weight), calcium stearate was further added as an additive by 0.5 parts by weight based on 100 parts by weight of the magnetic powder, which were sufficiently mixed and stirred in a planetary mixer with a water cooling jacket (40 rpm at 30° C.), to obtain a composition before molding resin-bonded type magnets.

Among the compositions thus obtained, those for Comparative Examples 3 and 4 using nylon 12 for resin were extruded by a 20 mmϕ single extruder (L/D=25, CR=2.0, number of rotation=20 rpm, 5 mmϕ strand die, cylinder temperature at 200 to 220° C. and dice temperature at 100° C. to 150° C.), and pellet compounds for molding resin bonded type magnets of ϕ5 mm×5 mm were prepared by a hot cut pelletizer.

3. Injection Molding Method

The compositions or the compounds were molded by a injection molding machine equipped with an inline screw type or plunger type magnetic field generation device into cylindrical test resin-bonded type magnets each of ϕ10 mm×15 mm under the condition at a molding temperature (cylinder temperature) of 30 to 180° C. and a mold temperature (curing temperature) of 100 to 220° C., and the obtained magnet molding products were evaluated respectively by the methods to be described later. Molding was conducted in the mold under the magnetic field at 15 to 20 kOe only when the magnetic powders of Sm—Co series (magnetic powder 2) and the Sm—Fe—N series (magnetic powder 1) were used.

4. Each of Evaluation Methods 4-1 Evaluation for Magnetic Properties

The magnetic properties of the resin-bonded type magnetic specimens obtained under the injection molding conditions described above were measured at a normal temperature by a TIOPHY type magnetic magnet flux meter. Among the magnetic properties, results for the coersive force, magnetization, squarness, maximum magnetic energy product and the orientation degree (result of) are shown in the following Table 2 to Table 4. The orientation degree was indicated by the SMM method, that is, by (magnetization of the resin-bonded type magnet after molding)/(magnetization measured by VSM at 100% magnetic powder×magnetic powder volume ratio of the resin-bonded type magnet after molding)×100]. The limit values by the existent methods were as shown in the following Table 1.

TABLE 1

| Magnetic properties | Unit | Sm—Fe—N series | Sm—Co series | Nd—Fe—B series |
|---|---|---|---|---|
| Coersive force (iHC) | kOe | 7.0 | 10.0 | 10.0 |
| Magnetization (Br) | kG | 7.5 | 6.8 | 6.4 |
| Squarness (Hk) | kOe | 3.6 | 4.8 | 3.3 |
| Maximum magnetic energy product (BH) max | MgOe | 11.9 | 10.5 | 7.3 |
| Orientation degree | % | 92 | 91 | — |

Accordingly, it can be judged "effective" if the value is more than the limit value in Table 1.

4-2 Mechanical strength

Test specimens each of 5 mm width×2 mm height×10 mm length were molded separately under the molding conditions described above, and the shearing punching strength was measured in accordance with JIS K 7214 (shearing test method by punching plastic material) as the mechanical strength. The results are shown together in the following Table 2 to Table 4.

TABLE 2

| | Unit | Example 1 | Example 2 | Example 3 | Example 4 | Example 5 |
|---|---|---|---|---|---|---|
| Composition Condition | | | | | | |
| Magnetic powder 1 | Pbw | 100 | 100 | 100 | — | — |
| Magnetic powder 2 | Pbw | — | — | — | 100 | — |
| Magnetic powder 3 | Pbw | — | — | — | — | 100 |
| UP resin 1' | Pbw | 10.0 | 10.0 | 20.0 | 10.0 | 10.0 |
| Curing agent 1 | Pbw | 0.01 | — | 0.02 | 0.01 | 0.01 |
| Curing agent 2 | Pbw | — | 0.01 | — | — | — |
| Molding temperature (cylinder) | ° C. | 25 | 25 | 25 | 25 | 25 |
| Mold temperature (curing temperature) | ° C. | 110 | 130 | 110 | 110 | 110 |
| Properties | | | | | | |
| Magnetic properties | | | | | | |
| Coersive force (iHC) | Koe | 9.5 | 8.6 | 9.4 | 9.8 | 9.9 |
| Magnetization (Br) | KG | 7.7 | 7.8 | 6.8 | 7.1 | 6.3 |
| Squareness (Hk) | Koe | 4.7 | 4.3 | 4.7 | 5.0 | 4.1 |
| Max energy product (BH) max | MG Oe | 12.5 | 12.4 | 9.6 | 9.8 | 7.9 |
| Orientation degree | % | 97 | 98 | 98 | 98 | — |
| Mechanical strength | Mpa | 92 | 89 | 121 | 90 | 86 |

TABLE 3

| | Unit | Example 6 | Example 7 | Example 8 | Example 9 | Example 10 |
|---|---|---|---|---|---|---|
| Composition | | | | | | |
| Magnetic powder 1 | Pbt | 100 | 100 | 100 | 100 | 100 |
| UP resin 1' | Pbt | 10 | — | — | 10 | — |
| UP resin 2' | Pbt | — | 10 | — | — | 5 |
| UP resin 3 | Pbt | — | — | 10 | — | 5 |
| Curing agent 1 | Pbt | 0.01 | 0.01 | 0.01 | 0.01 | 0.01 |
| Condition | | | | | | |
| Molding temperature (cylinder) | ° C. | 25 | 25 | 25 | 50 | 25 |
| Mold temperature (Curing temperature) | ° C. | 90 | 110 | 110 | 140 | 110 |

TABLE 3-continued

| | Unit | Example 6 | Example 7 | Example 8 | Example 9 | Example 10 |
|---|---|---|---|---|---|---|
| Properties<br>Magnetic properties | | | | | | |
| Coersive force (iHc) | Koe | 9.7 | 9.5 | 9.5 | 8.1 | 9.5 |
| Magnetization (Br) | KG | 7.7 | 7.5 | 7.7 | 7.8 | 7.7 |
| Squarness (Hk) | Koe | 4.5 | 4.7 | 4.6 | 4.0 | 4.5 |
| Max energy products (BH) max | MG Oe | 12.6 | 12.4 | 12.5 | 12.5 | 12.6 |
| Orientation degree | % | 97 | 94 | 97 | 98 | 97 |
| Mechanical strength | Mpa | 64 | 102 | 96 | 98 | 95 |

TABLE 4

| | Unit | Comp. Example 1 | Comp. Example 2 | Comp. Example 3 | Comp. Example 4 |
|---|---|---|---|---|---|
| Composition | | | | | |
| Magnetic powder 1 | Pbw | 100 | 100 | 100 | — |
| Magnetic powder 4 | Pbw | — | — | — | 100 |
| UP resin 1' | Pbw | 5 | 10 | — | — |
| Nylon 12 | Pbw | — | — | 10 | 10 |
| Curing agent 1 | Pbw | 0.01 | — | — | — |
| Curing agent 3 | Pbw | — | 0.01 | — | — |
| Condition | | | | | |
| Molding temperature (Cylinder) | ° C. | 25 | 25 | 250 | 250 |
| Mold temperature (Curing temperature) | ° C. | 110 | 180 | 110* | 110* |
| Properties<br>Magnetic properties | | | | | |
| Coersive force (iHc) | Koe | Not molda-ble | 7.0 | 6.7 | 9.5 |
| Magnetization (Br) | KG | Not molda-ble | 7.4 | 7.4 | 6.2 |
| Squarness (Hk) | Koe | Not molda-ble | 3.6 | 3.5 | 3.5 |
| Max energy products (BH) max | MG Oe | Not molda-ble | 11.8 | 11.9 | 9.4 |
| Orientation Degree | % | Not molda-ble | 93 | 91 | — |
| Mechanical strength | Mpa | Not molda-ble | 88 Burrs | 63 | 57 |

*Molding temperature or cooling temperature

As can be seen from Tables 2 to 4, the resin-bonded type magnets of Examples 1 to 10 have coersive force, magnetization, squarness, maximum energy product and orientation degree each being greater than the limit value in Table 1 and show extremely high values of 64 MPa or more also for the mechanical strength, whereas Comparative Example 1 could not be molded, Comparative Example 2 suffered from generation of whiskers to result in problem as products although the magnetic properties were near the limit values, and Comparative Examples 3 and 4 show a value below the limit value in any one of the magnetic properties.

Then, about 50 μm of layer was formed with an epoxy resin on the surface of the resin-bonded type magnet obtained in Example 1. On the other hand, a resin-bonded type magnet obtained by Example 1 with no formation of layer on the surface was also prepared, and the two specimens were left in a thermostable bath at a temperature of 60° C. and a humidity of 95% for 100 hours to observe the occurrence of rust and the results are shown in the following Table 5.

TABLE 5

| | Unit | Example 11 | Comp. Example 5 |
|---|---|---|---|
| Composition | | | |
| Magnetic powder 1 | Pbw | 100 | 100 |
| Up resin 1' | Pbw | 10.0 | 10.0 |
| Condition | | | |
| Curing agent 1 | Pbw | 0.01 | 0.01 |
| Molding temperature (Cylinder) | ° C. | 25 | 25 |

TABLE 5-continued

| | Unit | Example 11 | Comp. Example 5 |
|---|---|---|---|
| Mold temperature (Curing temperature) | ° C. | 110 | 110 |
| Surface layer formed | μm | 50 | Not |
| Rust formed | | Not | Formed |

As can be seen from Table 5, Example 11 in which the resin-bonded type magnet was coated at the surface with an epoxy resin showed extremely longer period till the occurrence of rust compared with comparative Example 5 with no coating and provided a sufficient anti-rusting effect.

Further, resin-bonded type magnets prepared by di-using the resin-bonded type magnet according to example 1 and Comparative Example 3 are to be explained.

At first, resin-bonded type magnets according to Example 1 and Comparative Example 3 were pulverized by a plastic pulverizer, and sieved to maximum grain size of 100 μm or less and resin-bonded type magnets were prepared by the method as described in 1 to 3 above, and the performance thereof was evaluated by the method described in 4 above. The results are shown in Table 6.

TABLE 6

| | | Pulverizate of Example 1 used | | Pulverizates of Comp. Example 3 | |
|---|---|---|---|---|---|
| | Unit | Example 12 | Example 13 | Comp. Example 6 | Comp. Example 7 |
| Composition | | | | | |
| Pulverizates | pbw | 100 | 100 | 100 | 100 |
| UP resin 1' | pbw | 10.0 | — | 10.0 | — |
| Nylon 12 | pbw | — | 10.0 | — | 10.0 |
| Curing agent 1 | pbw | 0.01 | — | 0.01 | 10.0 |
| Condition | | | | | |
| Molding temperature (Cylinder) | ° C. | 25 | 250 | 25 | 250 |
| Molding temperature (Curing temperature) | ° C. | 110 | 110* | 110 | 110* |
| Properties | | | | | |
| Magnetic Propert | | | | | |
| Coersive (iHc) | kOe | 9.1 | 7.2 | 6.0 | 4.3 |
| Magnetization (Br) | kG | 6.2 | 6.0 | 6.0 | 5.8 |
| Squarness (Hk) | kOe | 4.0 | 3.5 | 2.9 | 2.0 |
| Max energy products (BH) max | MG Oe | 7.7 | 7.2 | 6.8 | 6.7 |
| Orientation | % | 95 | 96 | 90 | 92 |
| Mechanical strength | MPa | 198 | 176 | 186 | 171 |

*Molding temperature or cooling temperature

As can be seen from Table 6, the resin-bonded type magnets obtained in Example 12 and Example 13 showed more excellent magnetic properties compared with those obtained in Comparative Example 6 and Comparative Example 7.

Industrial Applicability

As has been described above according to this invention, a resin-bonded type magnet excellent in the magnetic properties, degree of freedom for the shape and mechanical strength, further capable of providing an anti-rusting effect and improving the yield for the product can be provided by manufacturing a composition comprising a magnetic powder and an unsaturated polyester resin by an injection molding process or the like and it is particularly useful in an extensive field including, for example, general home electronic products, communication and acoustic equipments, medical equipments and industrial equipments.

What is claimed is:

1. A resin-bonded type magnet prepared by molding a composition comprising a magnetic powder and resin binder using injection molding, injection compression molding or transfer molding, said magnet powder having an anisotropic magnetic field (HA) of 50 KOe or more, and said resin binder including at least one unsaturated polyester resin hardened material as a major component and containing a peroxide, or a reaction product thereof, that can be hardened at a temperature of 150° C. or lower said composition having a viscosity at a molding temperature, as measured by a rotational viscometer, in a mixed and conditioned state before adding the magnetic powder, of from 100 mPa·s to 5,000 mPa·s.

2. A resin-bonded type magnet as defined in claim 1, wherein 50% by weight or more of the particles of the magnetic powder have a particle size of 100 μm or less.

3. The resin-bonded type magnet as claimed in claim 1, wherein the addition amount of the unsaturated polyester resin exceeds 5 parts by weight but is less than 50 parts by weight based on 100 parts by weight of the magnetic powder.

4. The resin-bonded type magnet as claimed in claim 1, wherein the peroxide is an organic peroxide having a decomposition temperature for obtaining a half life of 10 hours of 120° C. or lower.

5. The resin-bonded type magnet as claimed in claim 1, a surface of which is further coated with a thermosetting resin.

6. A resin-bonded type magnet prepared by again pulverizing the resin-bonded type magnet as claimed in claim 1 and then again mixing with a thermosetting resin or a thermoplastic resin.

* * * * *